US012812504B2

(12) United States Patent
Pirmagomedov et al.

(10) Patent No.: US 12,812,504 B2
(45) Date of Patent: Nov. 24, 2026

(54) RE-ROUTING DATA TRAFFIC IN AN INTEGRATED ACCESS AND BACKHAUL NETWORK

(71) Applicant: Nokia Solutions and Networks Oy, Espoo (FI)

(72) Inventors: Rustam Pirmagomedov, Oulu (FI); Malgorzata Tomala, Wroclaw (PL)

(73) Assignee: Nokia Solutions and Networks Oy, Espoo (FI)

( * ) Notice: Subject to any disclaimer, the term of this patent is extended or adjusted under 35 U.S.C. 154(b) by 264 days.

(21) Appl. No.: 18/713,472

(22) PCT Filed: Nov. 16, 2022

(86) PCT No.: PCT/EP2022/082074
§ 371 (c)(1),
(2) Date: May 24, 2024

(87) PCT Pub. No.: WO2023/094233
PCT Pub. Date: Jun. 1, 2023

(65) Prior Publication Data

US 2025/0024348 A1 Jan. 16, 2025

(30) Foreign Application Priority Data

Nov. 29, 2021 (FI) ..................................... 20216219

(51) Int. Cl.
*H04W 40/22* (2009.01)
*H04L 45/125* (2022.01)
*H04W 40/28* (2009.01)

(52) U.S. Cl.
CPC ........... *H04W 40/22* (2013.01); *H04L 45/125* (2013.01); *H04W 40/28* (2013.01)

(58) Field of Classification Search
CPC ...... H04W 40/22; H04W 40/28; H04L 45/125
(Continued)

(56) References Cited

U.S. PATENT DOCUMENTS

| | | | | |
|---|---|---|---|---|
| 9,756,528 | B2 | 9/2017 | Nenner et al. | |
| 10,136,359 | B2 * | 11/2018 | Hampel | H04L 45/04 |
| 2021/0105698 | A1 * | 4/2021 | Jactat | H04L 45/302 |

FOREIGN PATENT DOCUMENTS

| | | | |
|---|---|---|---|
| CN | 112822748 | A | 5/2021 |
| WO | 2017/004253 | A1 | 1/2017 |

(Continued)

OTHER PUBLICATIONS

"3rd Generation Partnership Project; Technical Specification Group Radio Access Network; NR; Backhaul Adaptation Protocol (BAP) specification (Release 16)", 3GPP TS 38.340, V16.5.0, Jun. 2021, pp. 1-22.

(Continued)

*Primary Examiner* — Christopher R Crompton
(74) *Attorney, Agent, or Firm* — Nokia Solutions and Networks Oy

(57) ABSTRACT

Disclosed is a method comprising receiving, by a network node in an integrated access and backhaul network, from an integrated access and backhaul donor, a message indicating one or more expected available capacities per route for a plurality of routes in the integrated access and backhaul network; and re-routing, by the network node, data traffic to one or more routes of the plurality of routes based at least partly on the one or more expected available capacities per route.

13 Claims, 5 Drawing Sheets

(58) Field of Classification Search
USPC .......................................................... 370/392
See application file for complete search history.

(56) References Cited

FOREIGN PATENT DOCUMENTS

| | | | |
|---|---|---|---|
| WO | 2020/059470 | A1 | 3/2020 |
| WO | 2021/062627 | A1 | 4/2021 |
| WO | 2021/089519 | A1 | 5/2021 |
| WO | 2021/160140 | A1 | 8/2021 |

OTHER PUBLICATIONS

"3rd Generation Partnership Project; Technical Specification Group Radio Access Network; NG-RAN; F1 application protocol (F1AP) (Release 16)", 3GPP TS 38.473, V16.6.0, Jul. 2021, pp. 1-463.
"3rd Generation Partnership Project; Technical Specification Group Radio Access Network; NR; NR and NG RAN Overall Description; Stage 2 (Release 16)", 3GPP TS 38.300, V16.6.0, Jun. 2021, pp. 1-152.
"3rd Generation Partnership Project; Technical Specification Group Radio Access Network; NR;Study on Integrated Access and Backhaul; (Release 16)", 3GPP TR 38.874, V16.0.0, Dec. 2018, pp. 1-111.
"[AT112-e][031][eIAB] Topology Adaptation (QC)", 3GPP TSG-RAN WG2 Meeting #112-e, R2-2011125, Agenda: 8.4.3, Qualcomm Incorporated, Nov. 2-13, 2020, pp. 1-26.
"Consideration of topology adaptation enhancement for R17 Iab", 3GPP TSG-RAN WG2 Meeting #113-e, R2-2101071, Agenda: 8.4.3, Huawei, Jan. 25-Feb. 5, 2021, pp. 1-11.
"Discussion on Topology Adaptation Enhancements", 3GPP TSG RAN WG2 Meeting #113e, R2-2100359, Agenda: 8.4.3, Intel Corporation, Jan. 25-Feb. 5, 2020, 12 pages.
"3rd Generation Partnership Project; Technical Specification Group Radio Access Network; NG-RAN; Architecture description (Release 16)", 3GPP TS 38.401, V16.6.0, Jul. 2021, pp. 1-79.
"Discussion on RLF indication enhancement and local routing for R17-IAB", 3GPP TSG-RAN WG2 Meeting #113-e, R2-2101208, Agenda: 8.4.3, Canon Research Centre France, Jan. 25-Feb. 5, 2021, pp. 1-6.
"Discussion on local routing, LCG extension, and CP-UP separation", 3GPP TSG-RAN WG2 Meeting #115-e, R2-2108744, Agenda: 8.4.3, LG Electronics Inc., Aug. 16-27, 2021, 9 pages.
"Open issues on (re-)routing", 3GPP TSG-RAN WG2 Meeting #115-e, R2-2107648, Agenda: 8.4.3, Fujitsu, Aug. 16-27, 2021, 9 pages.
"Summary of [Post114-e][075][eIAB] Open Issues on Re-routing", 3GPP TSG-RAN WG2 Meeting #115 electronic, R2-21XXX, Agenda: 8.4, Huawei, Aug. 16-27, 2021, pp. 1-47.
"3rd Generation Partnership Project; Technical Specification Group Radio Access Network; NR; Physical layer measurements (Release 16)", 3GPP TS 38.215, V16.4.0, Dec. 2020, pp. 1-25.
"3rd Generation Partnership Project; Technical Specification Group Radio Access Network; NR; Layer 2 Measurements; (Release 16)", 3GPP TS 38.314, V16.3.0, Mar. 2021, pp. 1-20.
Thompson et al., "Wide-Area Internet Traffic Patterns and Characteristics", IEEE Network, vol. 11, No. 06, Nov.-Dec. 1997, pp. 10-23.
"[Post112-e][066][eIAB] Topology Adaptation (QC)", 3GPP TSG-RAN WG2 Meeting #113e, R2-20xxxxx, Agenda: 8.4.3, Qualcomm Incorporated, Jan. 5, 2021, pp. 1-25.
Office action received for corresponding Finnish Patent Application No. 20216219, dated Jun. 17, 2022, 7 pages.
Office action received for corresponding Finnish Patent Application No. 20216219, dated Oct. 28, 2022, 6 pages.
International Search Report and Written Opinion received for corresponding Patent Cooperation Treaty Application No. PCT/EP2022/082074, dated Feb. 14, 2023, 18 pages.
"IAB Routing and Topology Management for Architecture 1a", 3GPP TSG-RAN WG3 Meeting #102, R3-186665, Agenda: 24.2, Nokia, Nov. 12-16, 2018, 4 pages.
"Introduce cost factor in local re-routing", 3GPP TSG-RAN WG2 Meeting #115 electronic, R2-2108054, Agenda: 8.4.3, Sony, Aug. 9-27, 2021, 2 pages.

* cited by examiner

RE-ROUTING DATA TRAFFIC IN AN INTEGRATED ACCESS AND BACKHAUL NETWORK

RELATED APPLICATION

This application was originally filed as PCT Application No. PCT/EP2022/082074, filed on Nov. 16, 2022, which claims priority from FI Application No. 20216219, filed on Nov. 29, 2021, of which priority is claimed and is incorporated herein by reference in its entirety.

FIELD

The following exemplary embodiments relate to wireless communication and to integrated access and backhaul networks.

BACKGROUND

Integrated access and backhaul allows deployment of base stations with wireless backhaul transport. There is a challenge in how to address a radio link failure or congestion of a backhaul link in an integrated access and backhaul network.

SUMMARY

The scope of protection sought for various exemplary embodiments is set out by the claims. The exemplary embodiments and features, if any, described in this specification that do not fall under the scope of the claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: estimate one or more expected available capacities per route for a plurality of routes in an integrated access and backhaul network, wherein the one or more expected available capacities per route are estimated based at least partly on a capacity of one or more backhaul links per route of the plurality of routes; and indicate, to one or more network nodes in the integrated access and backhaul network, the one or more expected available capacities per route for the plurality of routes.

According to another aspect, there is provided an apparatus comprising means for: estimating one or more expected available capacities per route for a plurality of routes in an integrated access and backhaul network, wherein the one or more expected available capacities per route are estimated based at least partly on a capacity of one or more backhaul links per route of the plurality of routes; and indicating, to one or more network nodes in the integrated access and backhaul network, the one or more expected available capacities per route for the plurality of routes.

According to another aspect, there is provided a method comprising: estimating, by an integrated access and backhaul donor, one or more expected available capacities per route for a plurality of routes in an integrated access and backhaul network, wherein the one or more expected available capacities per route are estimated based at least partly on a capacity of one or more backhaul links per route of the plurality of routes; and indicating, by the integrated access and backhaul donor, to one or more network nodes in the integrated access and backhaul network, the one or more expected available capacities per route for the plurality of routes.

According to another aspect, there is provided a computer program product comprising program instructions which, when run on a computing apparatus, cause the computing apparatus to perform at least the following: estimating one or more expected available capacities per route for a plurality of routes in an integrated access and backhaul network, wherein the one or more expected available capacities per route are estimated based at least partly on a capacity of one or more backhaul links per route of the plurality of routes; and indicating, to one or more network nodes in the integrated access and backhaul network, the one or more expected available capacities per route for the plurality of routes.

According to another aspect, there is provided a computer program comprising instructions for causing an apparatus to perform at least the following: estimating one or more expected available capacities per route for a plurality of routes in an integrated access and backhaul network, wherein the one or more expected available capacities per route are estimated based at least partly on a capacity of one or more backhaul links per route of the plurality of routes; and indicating, to one or more network nodes in the integrated access and backhaul network, the one or more expected available capacities per route for the plurality of routes.

According to another aspect, there is provided a computer readable medium comprising program instructions for causing an apparatus to perform at least the following: estimating one or more expected available capacities per route for a plurality of routes in an integrated access and backhaul network, wherein the one or more expected available capacities per route are estimated based at least partly on a capacity of one or more backhaul links per route of the plurality of routes; and indicating, to one or more network nodes in the integrated access and backhaul network, the one or more expected available capacities per route for the plurality of routes.

According to another aspect, there is provided a non-transitory computer readable medium comprising program instructions for causing an apparatus to perform at least the following: estimating one or more expected available capacities per route for a plurality of routes in an integrated access and backhaul network, wherein the one or more expected available capacities per route are estimated based at least partly on a capacity of one or more backhaul links per route of the plurality of routes; and indicating, to one or more network nodes in the integrated access and backhaul network, the one or more expected available capacities per route for the plurality of routes.

According to another aspect, there is provided an apparatus comprising at least one processor, and at least one memory including computer program code, wherein the at least one memory and the computer program code are configured, with the at least one processor, to cause the apparatus to: receive, from an integrated access and backhaul donor, a message indicating one or more expected available capacities per route for a plurality of routes in an integrated access and backhaul network; and re-route data traffic to one or more routes of the plurality of routes based at least partly on the one or more expected available capacities per route.

According to another aspect, there is provided an apparatus comprising means for: receiving, from an integrated access and backhaul donor, a message indicating one or more expected available capacities per route for a plurality of routes in an integrated access and backhaul network; and re-routing data traffic to one or more routes of the plurality of routes based at least partly on the one or more expected available capacities per route.

According to another aspect, there is provided a method comprising: receiving, by a network node in an integrated access and backhaul network, from an integrated access and backhaul donor, a message indicating one or more expected available capacities per route for a plurality of routes in the integrated access and backhaul network; and re-routing, by the network node, data traffic to one or more routes of the plurality of routes based at least partly on the one or more expected available capacities per route.

According to another aspect, there is provided a computer program comprising instructions for causing an apparatus to perform at least the following: receiving, from an integrated access and backhaul donor, a message indicating one or more expected available capacities per route for a plurality of routes in an integrated access and backhaul network; and re-routing data traffic to one or more routes of the plurality of routes based at least partly on the one or more expected available capacities per route.

According to another aspect, there is provided a computer program product comprising program instructions which, when run on a computing apparatus, cause the computing apparatus to perform at least the following: receiving, from an integrated access and backhaul donor, a message indicating one or more expected available capacities per route for a plurality of routes in an integrated access and backhaul network; and re-routing data traffic to one or more routes of the plurality of routes based at least partly on the one or more expected available capacities per route.

According to another aspect, there is provided a computer readable medium comprising program instructions for causing an apparatus to perform at least the following: receiving, from an integrated access and backhaul donor, a message indicating one or more expected available capacities per route for a plurality of routes in an integrated access and backhaul network; and re-routing data traffic to one or more routes of the plurality of routes based at least partly on the one or more expected available capacities per route.

According to another aspect, there is provided a non-transitory computer readable medium comprising program instructions for causing an apparatus to perform at least the following: receiving, from an integrated access and backhaul donor, a message indicating one or more expected available capacities per route for a plurality of routes in an integrated access and backhaul network; and re-routing data traffic to one or more routes of the plurality of routes based at least partly on the one or more expected available capacities per route.

According to another aspect, there is provided a system comprising at least an integrated access and backhaul donor and a network node in an integrated access and backhaul network. The integrated access and backhaul donor is configured to: estimate one or more expected available capacities per route for a plurality of routes in an integrated access and backhaul network, wherein the one or more expected available capacities per route are estimated based at least partly on a capacity of one or more backhaul links per route of the plurality of routes; and transmit, to the network node, a message indicating the one or more expected available capacities per route for the plurality of routes. The network node is configured to: receive, from the integrated access and backhaul donor, the message indicating the one or more expected available capacities per route for the plurality of routes; and re-route data traffic to one or more routes of the plurality of routes based at least partly on the one or more expected available capacities per route.

According to another aspect, there is provided a system comprising at least an integrated access and backhaul donor and a network node in an integrated access and backhaul network. The integrated access and backhaul donor comprises means for: estimating one or more expected available capacities per route for a plurality of routes in an integrated access and backhaul network, wherein the one or more expected available capacities per route are estimated based at least partly on a capacity of one or more backhaul links per route of the plurality of routes; and transmitting, to the network node, a message indicating the one or more expected available capacities per route for the plurality of routes. The network node comprises means for: receiving, from the integrated access and backhaul donor, the message indicating the one or more expected available capacities per route for the plurality of routes; and re-routing data traffic to one or more routes of the plurality of routes based at least partly on the one or more expected available capacities per route.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
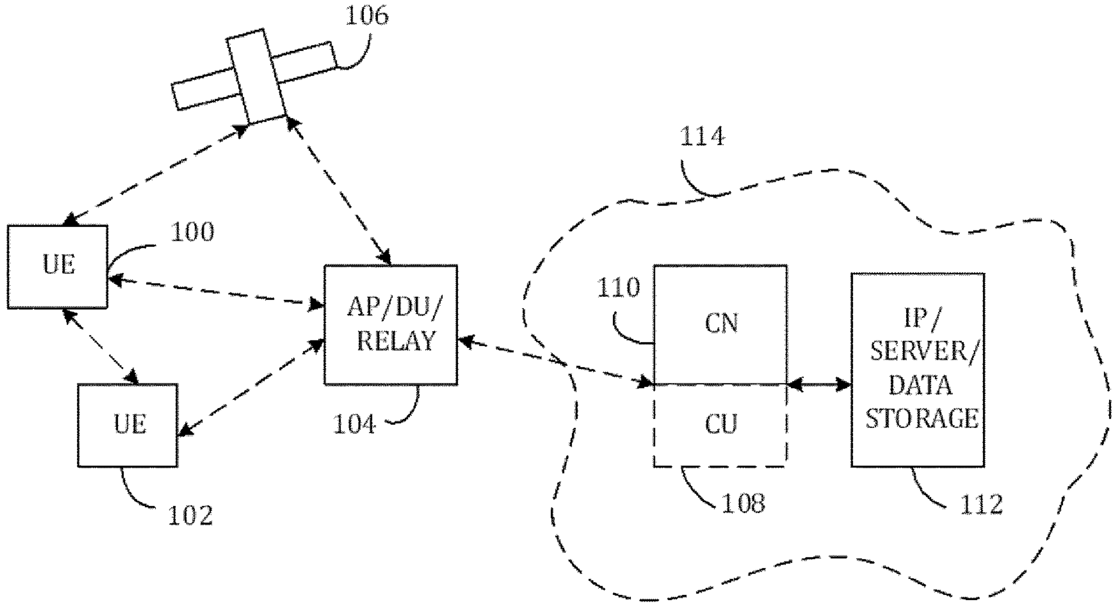
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The (e/g)NodeB may also be referred to as a base station, an access point or any other type of interfacing device including a relay station capable of operating in a wireless environment. The (e/g) NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW) for providing connectivity of user devices (UEs) to external packet data networks, mobility management entity (MME), access and mobility management function (AMF), or location management function (LMF), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station. The self-backhauling relay node may also be called an integrated access and backhaul (IAB) node.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a centralized unit, CU 108) may be enabled for example by application of cloudRAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB.

Furthermore, the (e/g)nodeB or base station may also be split into: a radio unit (RU) comprising a radio transceiver (TRX), i.e., a transmitter (Tx) and a receiver (Rx); one or more distributed units (DUs) that may be used for the so-called Layer 1 (L1) processing and real-time Layer 2 (L2) processing; and a centralized unit (CU) (also known as a central unit) that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the (e/g)nodeB or base station. The DU may be defined as a logical node hosting radio link control (RLC), medium access control (MAC) and/or physical (PHY) layers of the (e/g)nodeB or base station. The operation of the DU may be at least partly controlled by the CU. The CU may comprise a control plane (CU-CP), which may be defined as a logical node hosting the RRC and the control plane part of the PDCP protocol of the CU for the (e/g)nodeB or base station. The CU may further comprise a user plane (CU-UP), which may be defined as a logical node hosting the user plane part of the PDCP protocol and the SDAP protocol of the CU for the (e/g)nodeB or base station.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be needed to provide such a network structure.

For fulfilling the need for improving the deployment and performance of communication systems, the concept of "plug-and-play" (e/g)NodeBs may be introduced. A network which may be able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

NR Release 16 provides an option for flexible RAN extension, referred to as integrated access and backhaul (IAB). IAB is a multi-hop approach to network deployment and allows deployment of base stations with wireless backhaul transport. It works by having a fraction of the deployed base stations act as IAB donors, using a fiber/wired connection. The remainder of the base stations without a wired connection are called IAB nodes, which may be wirelessly connected to the IAB donor and/or another IAB node via a wireless backhaul link. Both types of base stations may generate an equivalent cellular coverage area and appear identical to UEs in their coverage area. Thus, a benefit of IAB is that it enables flexible and dense deployment of NR cells without densifying the transport network proportionately. A diverse range of deployment scenarios can be envisioned, including support for outdoor small cell deployments, indoors, or even mobile relays (e.g., on buses or trains).

Figure 2:
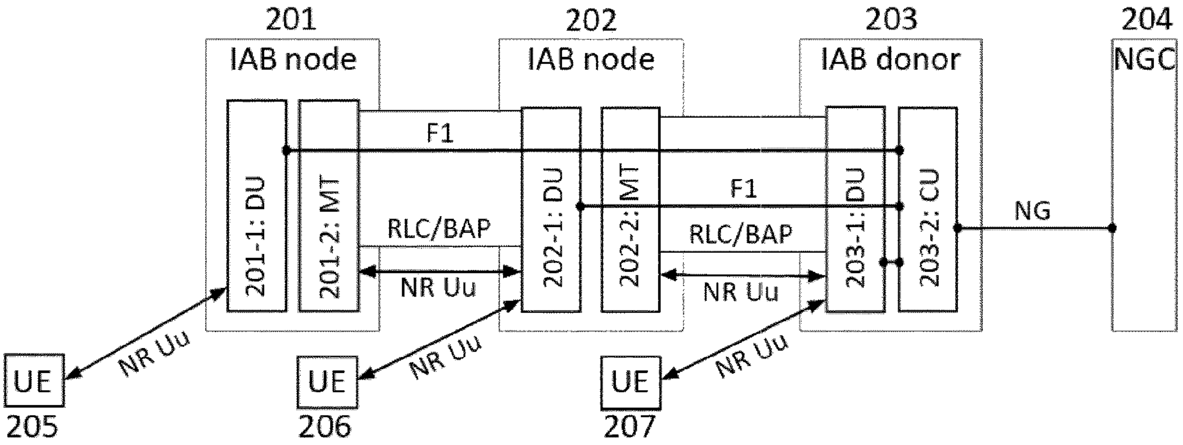
FIG. 2 illustrates an example of an integrated access and backhaul network.

FIG. 2 illustrates an example of an IAB network, to which some exemplary embodiments may be applied. It should be noted that FIG. 2 illustrates a simplified network architecture only showing some elements and functional entities, all being logical units whose implementation may differ from what is shown. The connections shown in FIG. 2 are logical connections; the actual physical connections may be different. It is apparent to a person skilled in the art that the network may also comprise other functions and structures than those shown in FIG. 2.

The IAB network may leverage CU/DU split base station architecture comprising a centralized unit (CU) and a distributed unit (DU). The centralized unit may also be referred to as a central unit. IAB nodes 201, 202 perform DU functions, while the IAB donor 203 (e.g., gNB) hosts the CU functionality 203-2 as well as a DU 203-1. The CU 203-2 may control the DU 203-1 of the IAB donor 203, as well as the DUs 201-1, 202-1 of the IAB nodes 201, 202.

The IAB node 201, 202 is a RAN node that supports wireless access to UEs and wirelessly backhauls the access traffic. The IAB donor 203 is a RAN node, which provides an interface to the core network 204 (e.g., next-generation core, NGC) for one or more UEs 205, 206, 207, as well as wireless backhauling functionality to IAB nodes 201, 202.

For communication with the parent node (e.g., another IAB node or the IAB donor 203) via an NR Uu interface, a given IAB node 201, 202 hosts a mobile termination (MT) function 201-2, 202-2 corresponding to the UE operation or a part of the UE operation. In other words, the MT function takes care of the backhaul link(s), i.e., link(s) between the IAB node and the parent node. In FIG. 2, the second IAB node 202 is a parent node of the first IAB node 201, and the IAB donor 203 is a parent node of the second IAB node 202.

The DU 201-1 and 202-1 of a given IAB node 201, 202 are connected to the CU 203-2 via an F1 interface. The DU of the IAB node is considered a normal cell from the UE perspective. The DU of the IAB node takes care of the access link(s), i.e., child link(s) between the IAB node 201, 202 and UE(s) 205, 206, 207 via an NR Uu interface, and/or between the IAB node and other IAB node(s) (multi-hop scenario) via an NR Uu interface. It should be noted that a given IAB node may comprise one or more DUs.

In FIG. 2, the communication between a given MT function 201-2, 202-2 and DU 202-1, 203-1 may be based on the radio link control (RLC) protocol, and/or backhaul adaptation protocol (BAP). BAP is an IAB-specific protocol for the routing of data packets from the IAB donor to a target IAB node.

Figure 3:
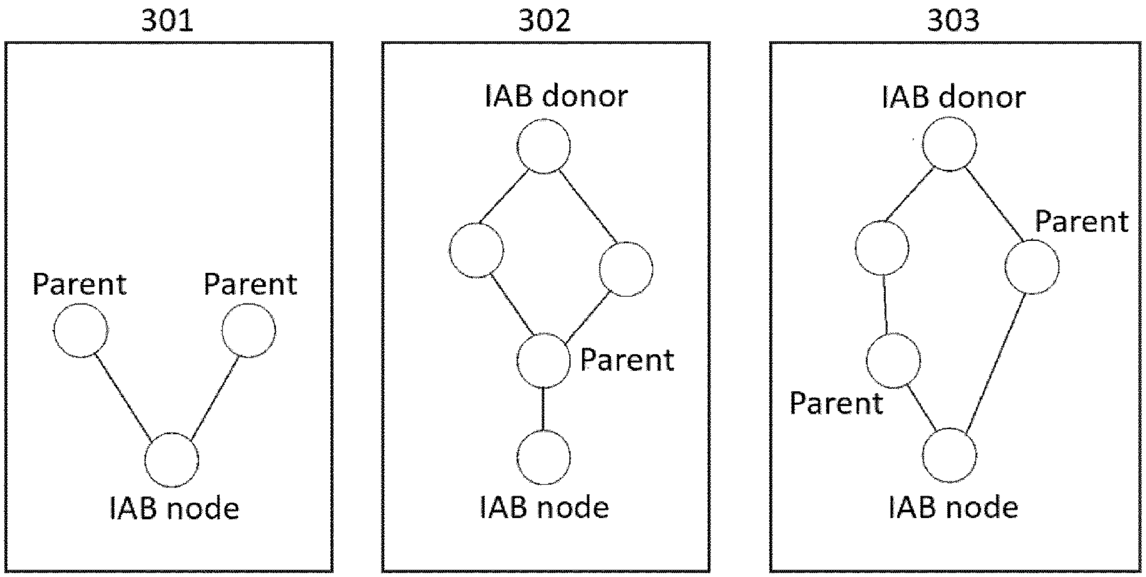
FIG. 3 illustrates examples for link and route redundancy in an integrated access and backhaul network.

IAB may support link and route redundancy (i.e., multiple paths to donor) to enhance service reliability. FIG. 3 illustrates examples for the link and route redundancy. Block 301 illustrates an example, wherein the IAB node is multi-connected to two parent nodes. Block 302 illustrates an example, wherein the IAB node has redundant routes to the IAB donor. Block 303 illustrates an example, wherein a multi-connected IAB node has redundant routes to the IAB donor.

During IAB operation, backhaul links may suffer from radio link failures (RLF). These failures may lead to service interruption and degraded quality of service (QoS) for the UEs. In addition to RLFs, the IAB network may suffer from congestion. Congestion may be defined as a situation at an IAB node, wherein incoming traffic for some channel overwhelms the outgoing traffic, and the buffer on that IAB node is filled over a pre-defined threshold.

An IAB node may re-route data traffic to an alternative connection locally in the case of RLF. Re-routing may also be performed in cases other than RLF, including congestions at backhaul links and/or load balancing purposes. Local re-routing may be faster than the centralized approach (controlled by IAB donor), thus reducing service interruption time.

When performing local re-routing, there may be several alternative routes to the same destination. However, re-routing to one of these alternative routes may result in congestion, if the capacity of the alternative route is not sufficient for accommodating the re-routed traffic.

Figure 4:
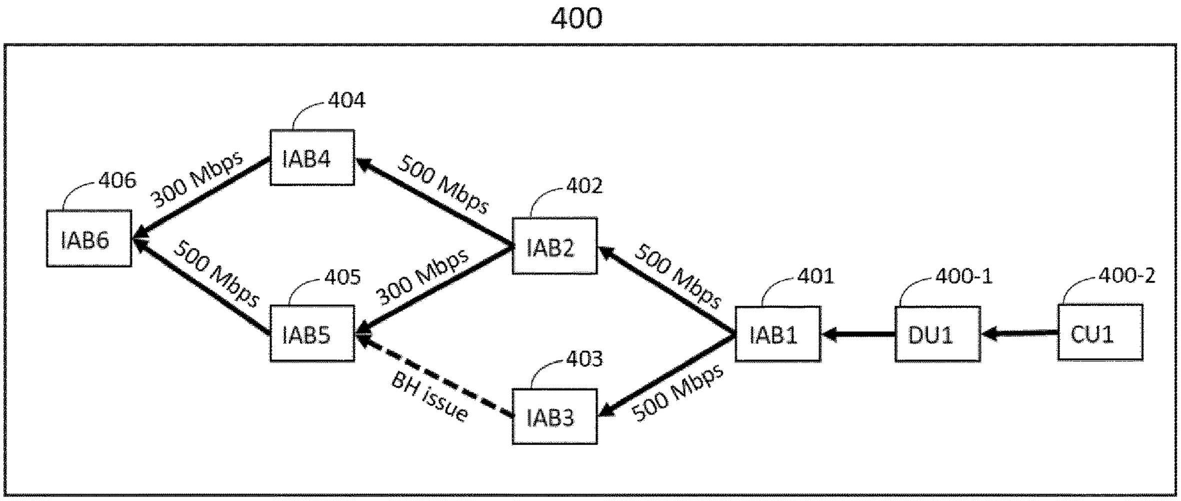
FIG. 4 illustrates re-routing in an integrated access and backhaul network.

To illustrate the problem better, let us assume an IAB network 400 as presented in FIG. 4. FIG. 4 illustrates re-routing in an IAB network due to the backhaul issue (e.g., RLF or congestion). The network comprises a DU 400-1 (DU1) of an IAB donor, a CU 400-2 (CU1) of the IAB donor, a first IAB node 401 (IAB1), a second IAB node 402 (IAB2), a third IAB node 403 (IAB3), a fourth IAB node 404 (IAB4), a fifth IAB node 405 (IAB5), and a sixth IAB node 406 (IAB6). The arrows between the IAB nodes illustrate the backhaul (BH) links between the IAB nodes. The numbers associated with the backhauls links indicate the available (free) capacities of those backhaul links in megabits per second (Mbps). For example, the capacity of the backhaul link between IAB1 and IAB2 is 500 Mbps in this example.

Referring to FIG. 4, IAB1 performs re-routing of downlink traffic addressed to IAB6, because of a backhaul issue (e.g., RLF or congestion) between IAB3 and IAB5 on the original route (IAB1-IAB3-IAB5-IAB6). There are at least two alternative routes available for re-routing: a first route via IAB1-IAB2-IAB5-IAB6, and a second route via IAB1-IAB2-IAB4-IAB6. As can be seen in FIG. 4, these two alternative routes are partly overlapping (i.e., both routes comprise the backhaul link between IAB1 and IAB2). Assuming that the data traffic at the original route (IAB1-IAB3-IAB5-IAB6) was about 400 Mbps, re-routing to one of these alternative routes may cause congestion either in the backhaul link between IAB4 and IAB6 or in the backhaul link between IAB2 and IAB5, since the capacity of those backhaul links is just 300 Mbps (i.e., less than the 400 Mbps data traffic at the original route).

Some exemplary embodiments may enhance the routing configuration used in IAB with the expected available capacity of different routes and instructions for using the alternative routes for re-routing. IAB nodes may use this information to decide whether data traffic should be re-routed onto one or more alternative routes, and in what proportion. The available capacity of a given route may refer to the maximum amount of data traffic that may be transmitted through the route without congestion. More specifically, the available capacity of a given route may refer to the available amount of data traffic that may be processed/buffered and further transmitted. A given route may comprise one or more backhaul links. The expected available capacity of a given route may correspond to the available capacity of a bottleneck backhaul link on that route. The bottleneck backhaul link refers to the backhaul link with the lowest available capacity on that route.

In an exemplary embodiment, the CU of an IAB donor estimates the expected available capacity per route for a plurality of routes in an IAB network by obtaining and processing information about the capacity and measured amount of data traffic at each backhaul link on each route in the IAB network. The CU of the IAB donor may further use this information for configuring re-routing instructions to one or more IAB nodes. More specifically, the IAB donor may provide, to the one or more IAB nodes, information about the expected available (i.e., free) capacity per route for the plurality of routes. A given IAB node may use this information for reducing the risk of congestion, when re-routing data traffic to one or more alternative routes. A given route may be identified by a routing identifier (ID) associated with that route. In other words, the routing IDs of different routes may be used to distinguish the different routes from each other.

In some situations, none of the alternative routes may be capable of accommodating the re-routed data traffic alone. In this case, the IAB node may re-route data traffic to more than one alternative route in parallel. The proportion of data traffic offloaded to each route may be decided based on the expected available capacities of the alternative routes and/or interrelation coefficients.

The interrelation coefficients may indicate an interrelation, or impact, between the expected available capacities of alternative routes. In other words, the interrelation coefficient reflects the dependency between the expected available capacities of partly overlapping routes. For example, in the deployment of FIG. 4, the available (i.e., free) capacity of each of the alternative routes (IAB1-IAB2-IAB4-IAB6 and IAB1-IAB2-IAB5-IAB6) is 300 Mbps according to the bottleneck backhaul links IAB4-IAB6 and IAB2-IAB5. However, if 300 Mbps of data traffic is offloaded to one of these alternative routes, then that will also impact the remaining capacity of the other alternative route, since these two alternative routes overlap each other at the backhaul link IAB1-IAB2. Thus, the available capacity of the other alternative route is reduced to 200 Mbps, because the bottleneck is now at backhaul link IAB1-IAB2 (500 Mbps-300 Mbps=200 Mbps).

The interrelation coefficients may be provided to the IAB node(s) by the CU of the IAB donor. The interrelation coefficients may be provided together with routing configuration information (e.g., the expected available capacities of the alternative routes). Thus, the routing configuration information maintained by the IAB node(s) may be extended with the expected available capacities of the routes and their interrelation.

In some situations, the IAB donor may provide to IAB node(s) information about average expected data traffic per route in addition to the expected available capacities and the interrelation coefficients. Having this information, the IAB node may locally limit the utilization of a particular route for re-routing, if the currently observed data traffic at that route or an overlapping route is higher than the expected data traffic provided by the IAB donor (which may be used for estimation of the expected available capacity). Such a situation may appear due to an unusual data burst (e.g., when another IAB node performs re-routing).

The IAB node may also locally limit the re-routing to an alternative route, if the current capacity of the egress link related to that route is lower than the expected available capacity for this route (as indicated by the IAB donor). The egress link is an outgoing (transmitting) link. For example, in FIG. 4, the uplink from IAB2 to IAB1 is an egress link for IAB2, but an ingress link for IAB1.

Figure 5:
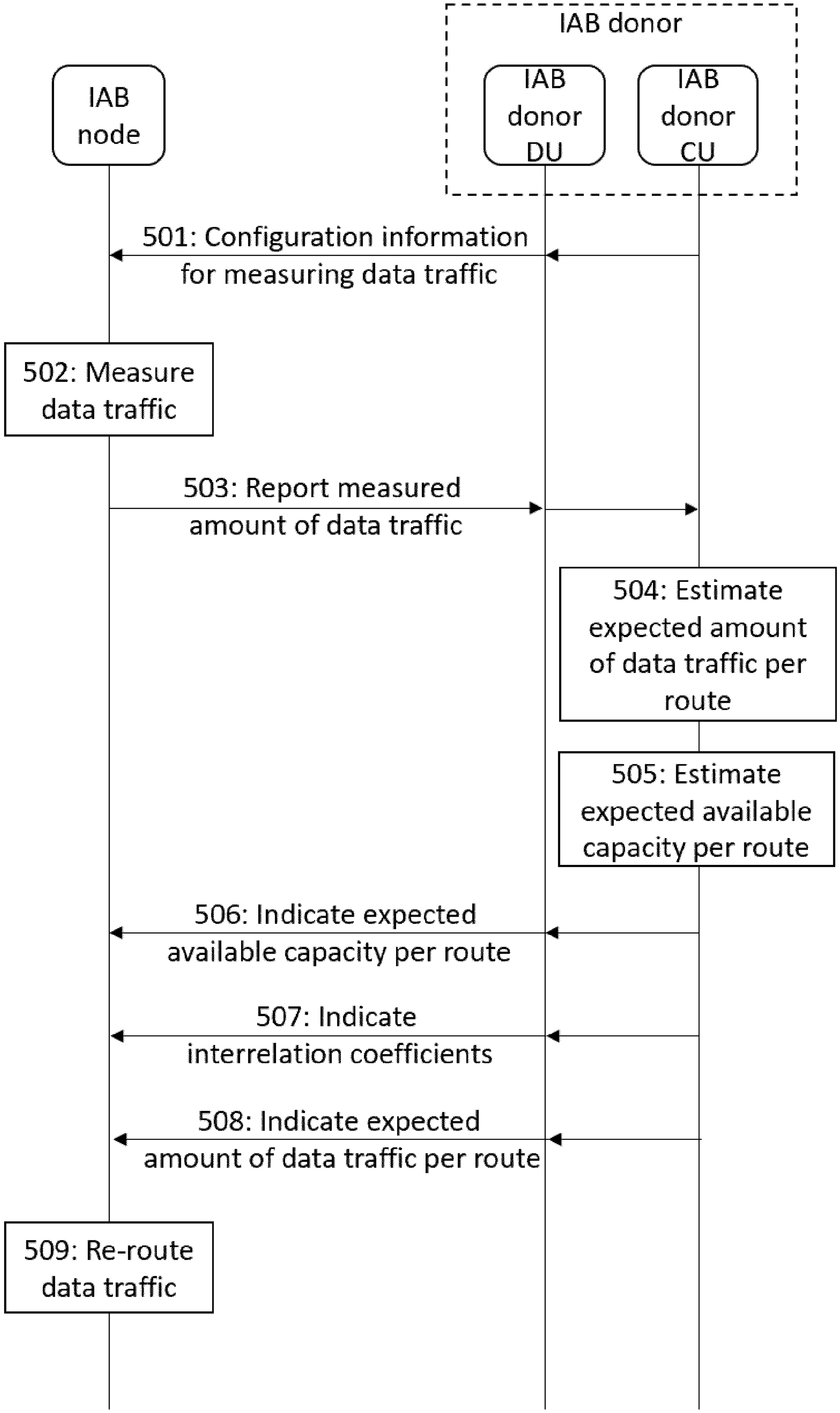
FIGS. 5-6 illustrate signaling diagrams according to some exemplary embodiments.

FIG. 5 illustrates a signaling diagram according to an exemplary embodiment.

Referring to FIG. 5, in step 501, the CU of an IAB donor transmits configuration information for measuring and reporting the amount of data traffic per route for a plurality of routes in an IAB network. The configuration information is transmitted to one or more IAB nodes in the IAB network via the DU of the IAB donor. In other words, the CU of the IAB donor may transmit the configuration information to the DU of the IAB donor, and the DU of the IAB donor may transmit (or forward) the configuration information to the one or more IAB nodes. Herein data traffic may also be referred to as network traffic or transit traffic.

The configuration information may indicate at least one of: a granularity for measuring the amount of data traffic, a time interval for reporting the measured amount of data traffic (e.g., reporting the measurements once per hour), and/or a time duration for measuring the amount of data traffic. For example, the granularity may indicate to measure the data traffic per routing ID, per backhaul link, and/or per radio link control (RLC) channel. The time duration indicates for how long the measurements should be performed. The time duration may be configured as a specific time duration, and the IAB node may calculate an average amount of data traffic measured during the time duration. Alternatively, the one or more IAB nodes may be configured to perform the measurements until further notice (i.e., without defining any specific time duration). For example, the one or more IAB nodes may perform the measurements until they receive a separate indication from the IAB donor triggering the one or more IAB nodes to report the measurement results.

The configuration information may be transmitted to the one or more IAB nodes via an F1 interface or RRC interface between the IAB donor and the one or more IAB nodes. For example, the IAB donor may initiate the collection of the data traffic measurements by configuring the one or more IAB nodes via the F1AP protocol to measure and the report the data traffic. For example, the configuration may be transmitted in a GNB-DU CONFIGURATION UPDATE message from the IAB donor to the one or more IAB nodes.

The GNB-DU CONFIGURATION UPDATE message may be extended with a measurements configuration information element to trigger the average data traffic calculation based on the measured data traffic. The average traffic calculation may be based on available buffer size, L2 measurements definitions, such as PRB (physical resource block) use, or Throughput or Data Volume measurement. Accordingly, the GNB-DU CONFIGURATION UPDATE message may be used to indicate a measurement triggering condition, upon which a given IAB node should start to perform the configured measurements.

Alternatively, instead of the configuration information, the CU of the IAB donor may transmit a request to the one or more IAB nodes for providing the measured amount of data traffic (measurement information) to the IAB donor. In other words, the request may be used to collect the measurement information (if the IAB node has measurement information available), but not necessarily to trigger the measurements. The request may indicate, for example, a granularity and/or time duration for the measurement information to be provided to the IAB donor.

In step 502, the one or more IAB nodes measure the data traffic according to the configuration information, granularity, and/or time duration. For example, the one or more IAB nodes may measure the amount of data traffic per route, per backhaul link, and/or per RLC channel, depending on the granularity indicated in the configuration information. The measurements may be performed by the MT function and/or the DU of a given IAB node. Alternatively, the one or more IAB nodes may measure the amount of data traffic with a different granularity and/or time duration than indicated in the configuration information or the request, but provide the measured amount of data traffic to the IAB donor according to the granularity and/or time duration indicated in the configuration information or in the request. In other words, the one or more IAB nodes may filter the measurement information available at the one or more IAB nodes according to the granularity and/or time duration indicated in the configuration information or the request.

In step 503, the one or more IAB nodes transmit, or report, information indicating the measured amount of data traffic per route for the plurality of routes to the CU of the IAB donor via the DU of the IAB donor. For example, the information may indicate the calculated average amount of data traffic per route. The one or more IAB nodes may transmit the information to the DU of the IAB donor, and the DU may then forward the information to the CU of the IAB donor. For example, the information indicating the measured amount of data traffic may be transmitted to the IAB donor via the F1 interface or RRC interface between the IAB donor and the one or more IAB nodes. It should be noted that the one or more IAB nodes may perform the measuring and reporting on a continuous basis (i.e., iteratively). For example, the one or more IAB nodes may report the measurements periodically according to the time interval indicated in the configuration information received in step 501.

It should be noted that the IAB donor may be aware of the data traffic at each route and each backhaul link in the IAB network, since any data traffic in the IAB network may go either from or to the IAB donor. Having this information, the IAB donor can estimate the expected available capacity at each route and/or backhaul link in the IAB network. However, such estimation may have some inaccuracy, for example if the data traffic has been re-routed due to backhaul issues. Thus, in order to obtain more accurate information about the data traffic, the one or more IAB nodes may measure the amount of data traffic per route (or per backhaul link), and periodically report the measurements to the CU of the IAB donor. Furthermore, in the future, IAB networks may be enhanced with local services, meaning that the data traffic may be localized between some IAB nodes, in which case the data traffic may not go through the IAB donor. In this case, the IAB donor may not be aware of the data traffic without the one or more IAB nodes reporting the measured amount of data traffic to the IAB donor.

In step 504, the CU of the IAB donor may estimate an expected amount of data traffic per route for the plurality of routes in the IAB network. For example, the expected amount of data traffic may be an expected average amount of data traffic. The expected amount of data traffic per route may be estimated by extrapolating the measured amount of data traffic per route.

In step 505, the CU of the IAB donor estimates one or more expected available capacities per route for a plurality of routes in the IAB network, wherein the one or more expected available capacities per route are estimated based at least partly on the capacity of the one or more backhaul links per route of the plurality of routes and/or the expected amount of data traffic per route for the plurality of routes. The expected available capacity of a given route may correspond to the available capacity of a bottleneck backhaul link on that route. The bottleneck backhaul link refers to the backhaul link with the lowest available capacity on that route. The available capacity of a given backhaul link may be defined as the total capacity of the backhaul link, i.e., the average amount of data traffic for the measured time duration. In other words, the capacity of the one or more backhaul links per route may be estimated based at least partly on the measured amount of data traffic (e.g., average amount of data traffic) per route reported by the one or more IAB nodes.

The variations of data traffic in the IAB network may follow some time-dependant patterns, for example during the day, during the week, during the year, etc. Thus, the IAB donor may average the data traffic measurements with respect to such patterns (e.g., for each hour separately, or for morning and evening time separately), and use this information to estimate the one or more expected available capacities per route. For example, it may not make sense to average the data traffic over 24 hours. During the night, the data traffic may be lower than during the day, and therefore averaging the night-time and daytime data traffic together may not be beneficial. Thus, a time-dependent pattern may be used to average the night-time data traffic (e.g., between Monday to Friday) and daytime data traffic (e.g., between Monday to Friday) separately. The IAB donor may indicate the time-dependent average data traffic (e.g., average daytime data traffic and average night-time data traffic) to the one or more IAB nodes. In that case, the one or more IAB nodes may detect if the actual data traffic (measured at the current moment) for a given route is higher than the average data traffic indicated by the IAB donor (which may be used to estimate the expected available capacity for that route). This may further enhance local re-routing decisions at the one or more IAB nodes.

As an alternative to the periodic capacity updates from the IAB donor, the one or more IAB nodes may be configured with multiple different expected available capacities per route in advance, but only one of them may be active at a specific pre-configured time interval. For example, a first expected available capacity for a given route may be active at a first time interval (e.g., at night-time), and a second expected available capacity for that route may be active at a second time interval (e.g., at daytime) different to the first time interval.

The CU of the IAB donor may also estimate a probability per expected available capacity of the one or more expected available capacities per route for the plurality of routes. In other words, instead of using exact values for the expected available capacity, the IAB donor may approximate their distribution. Based on this distribution, the IAB donor may specify the expected available capacity paired with the corresponding statistical probability. The probability per expected available capacity may be estimated statistically based on the measured amount of data traffic per route reported by the one or more IAB nodes. For example, an 85% probability of an expected available capacity of 1000 Mbps for a route means that, if this channel is checked for example 100 times randomly, then 85 times out of those 100 times it can be observed that there is 1000 Mbps of capacity available for use.

Table 1 below presents an example of the expected available capacities paired with the associated probability per expected available capacity. It should be noted that Table 1 is just one non-limiting example, and the granularity of data may be different than presented in Table 1.

TABLE 1

| Routing ID | Expected available capacity [Mbps] | Probability |
|---|---|---|
| Route 1 | 1000 | 85% |
| | 700 | 95% |
| | 300 | 97% |
| | 200 | 99% |
| Route 2 | 1000 | 85% |
| | 500 | 95% |
| | 300 | 97% |
| | 100 | 99% |

In step 506, the CU of the IAB donor indicates the one or more expected available capacities per route for the plurality of routes to the one or more IAB nodes in the IAB network via the DU of the IAB donor. The one or more expected available capacities may be indicated to the one or more IAB nodes in response to receiving the report(s) indicating the measured amount of data traffic per route for the plurality of routes from the one or more IAB nodes.

The one or more expected available capacities per route may be indicated to the one or more IAB nodes via the F1AP protocol. For example, the one or more expected available capacities per route may be indicated in a BAP MAPPING CONFIGURATION message transmitted from the IAB donor to the one or more IAB nodes. Alternatively, the one or more expected available capacities may be indicated in a dedicated message.

The CU of the IAB donor may also indicate in the message the probability per expected available capacity of the one or more expected available capacities per route for the plurality of routes. The one or more IAB nodes may use the probability information, when balancing data traffic between different alternative routes. For example, a 99% probability of 200 Mbps of available capacity at Route 1 means that, in 99% of cases for this time (e.g., time of the day), there is at least 200 Mbps of capacity available on this route. Therefore, in order to deliver 300 Mbps of data traffic with 99% reliability, 200 Mbps should be forwarded via Route 1 and 100 Mbps via Route 2. In another example, assuming there is 600 Mbps of data traffic that should be re-routed, the data traffic may be shared equally between Route 1 and Route 2 (i.e., 300 Mbps per route). Such a split may result in a 97% probability of delivery without congestion.

In step 507, the CU of the IAB donor indicates one or more interrelation coefficients indicating an interrelation between the one or more expected available capacities of at least two partly overlapping routes of the plurality of routes to the one or more IAB nodes via the DU of the IAB donor. The one or more interrelations coefficients reflect the dependency between the expected available capacities of the at least two partly overlapping routes. In other words, the one or more interrelation coefficients indicate the remaining expected available capacity at one or more routes of the plurality of routes. The one or more interrelation coefficients may be indicated together in the same message as the one or more expected available capacities per route. Alternatively, the interrelation coefficients may be indicated in a separate message.

An example of interrelation coefficients for IAB1 from FIG. 4 is shown in Table 2 below. Table 2 defines how data traffic can be re-routed, when there is an issue at the original route (Route 1). In this example, Table 2 indicates that the full expected available capacity of Route 2 should be used first for re-routing the data traffic, and then up to 65% of the expected available capacity at Route 3, if the capacity of Route 2 is not enough. When the original route (Route 1) experiences backhaul issues, IAB1 may use the alternative routes by following a specific priority order: first by utilizing 100% of the expected available capacity of Route 2 (as indicated by the interrelation coefficient 1.0 for Route 2), and if it is not enough, then it can also utilize up to 65% of the expected available capacity at Route 3 (as indicated by the interrelation coefficient 0.65 for Route 3). In other words, if the full expected available capacity of Route 2 is utilized, then the remaining expected available capacity of Route 3 is 65% of the full expected available capacity of Route 3, since Route 2 and Route 3 are partly overlapping (i.e., they both use the backhaul link between IAB1 and IAB2). For example, when 100% of the expected available capacity of Route 2 is 200 Mbps, and 300 Mbps of data traffic needs to be re-routed, then using only Route 2 is not enough. In such a case, some of the data traffic may also be re-routed to Route 3 in addition to Route 2. However, as indicated by the interrelation coefficients of Table 2, only up to 65% of the expected available capacity of Route 3 can be used, because Route 2 overlaps with Route 3 (i.e., they have one or more shared backhaul links), which has an impact on the expected available capacity of Route 3.

TABLE 2

| | Interrelations coefficients for alternative routes | |
|---|---|---|
| Original Routing ID | Route 2 (IAB1-IAB2-IAB5-IAB6) | Route 3 (IAB1-IAB2-IAB4-IAB6) |
| Route 1 | 1.0 | 0.65 |

The priority order in which the routes are used by the one or more IAB nodes for re-routing data traffic may be optimized and configured to the one or more IAB nodes by the IAB donor.

Alternatively, the IAB donor may indicate, or configure, a plurality of priority orders (i.e., some or all of the possible combinations of the routes) to the one or more IAB nodes (e.g., a first priority order comprising routes #2, #3, #4, and a second priority order comprising routes #3, #2, #4), as well as one or more interrelation coefficients according to each priority order. For example, the IAB donor may indicate one or more first interrelation coefficients indicating a first interrelation between the one or more expected available capacities of at least a first route and a second route of the plurality of routes according to a first priority order, wherein the first route is prioritized over the second route in the first priority order. Furthermore, the IAB donor may indicate one or more second interrelation coefficients indicating a second interrelation between the one or more expected available capacities of at least the first route and the second route of the plurality of routes according to a second priority order, wherein the second route is prioritized over the first route in the second priority order. The one or more IAB nodes may then locally select one priority order from the plurality of priority orders, and use the interrelation coefficient(s) associated with the selected priority order.

Alternatively, the IAB donor may indicate the one or more interrelation coefficients to the one or more IAB nodes without specifying any priority order for the routes. In this case, a given IAB node may locally decide the priority order in which to use the routes for re-routing data traffic.

In step 508, the CU of the IAB donor may indicate the expected amount of data traffic per route for the plurality of routes to the one or more IAB nodes via the DU of the IAB donor. The expected amount of data traffic per route may be indicated together in the same message as the one or more expected available capacities per route and the interrelation coefficients. Alternatively, the expected amount of data traffic per route may be indicated in a separate message.

Based on the expected amount of data traffic per route, the one or more IAB nodes may locally limit the utilization of a particular route for re-routing, if the currently observed traffic at that route or an overlapping route is higher than the expected data traffic indicated by the IAB donor (which may be used for estimation of the expected available capacity). Such a situation may appear due to an unusual data burst (e.g., when another IAB node performed re-routing).

In step 509, the one or more IAB nodes re-route data traffic to one or more routes of the plurality of routes based at least partly on the one or more expected available capacities per route, the one or more interrelation coefficients, and/or the expected amount of data traffic per route. After the one or more IAB nodes are configured with the one or more expected available capacities and/or interrelation coefficients, they may perform re-routing decisions locally at the one or more IAB nodes (i.e., without any additional signaling from the IAB donor). Triggers for local re-routing may comprise, for example, RLF indication and/or congestion (flow control feedback).

In some situations, none of the routes may be capable of accommodating the re-routed data traffic. In this case, the one or more IAB nodes may re-route data traffic to more than one route in parallel. In other words, the data traffic may be re-routed to both of the at least two partly overlapping routes. The one or more IAB nodes may determine the portion of data traffic offloaded to each of the routes based at least partly on the expected available capacities of the routes and the interrelation coefficients (their impact on each other).

Figure 6:
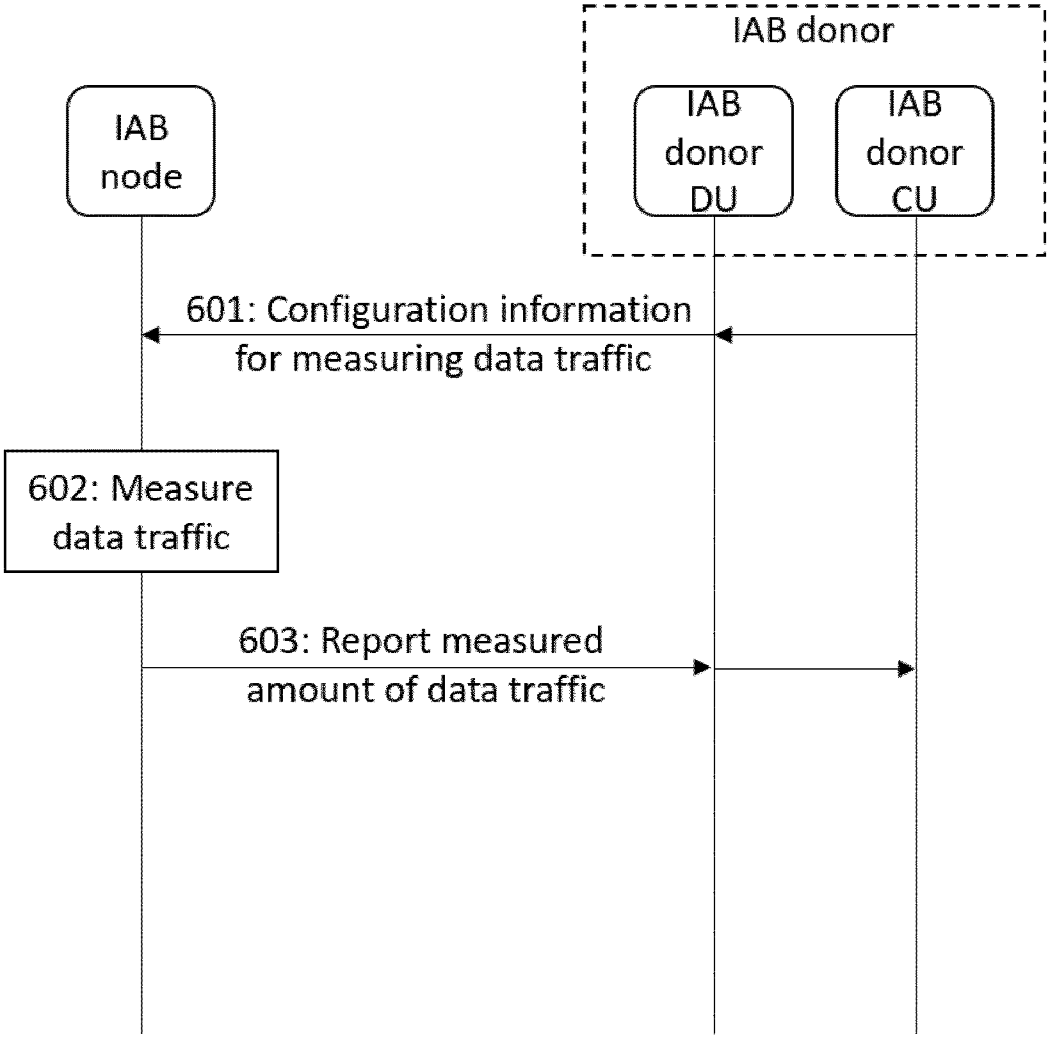

It should be noted that the measurement and reporting of data traffic by IAB nodes can also be used as a standalone solution for other use cases than estimating the expected available capacities of the routes. For example, such a standalone solution may be used for the IAB donor to capture the amount of local traffic in the IAB network. FIG. 6 illustrates a signaling diagram according to another exemplary embodiment for such as standalone solution.

Referring to FIG. 6, in step 601, the CU of an IAB donor transmits a configuration information for measuring and reporting the amount of data traffic per route for a plurality of routes in an IAB network. The configuration information is transmitted to one or more IAB nodes in the IAB network via the DU of the IAB donor. In other words, the CU of the IAB donor may transmit the configuration information to the DU of the IAB donor, and the DU of the IAB donor may transmit (or forward) the configuration information to the one or more IAB nodes. Herein data traffic may also be referred to as network traffic or transit traffic.

The configuration information may indicate at least one of: a granularity for measuring the amount of data traffic, a time interval for reporting the measured amount of data traffic (e.g., reporting the measurements once per hour), and/or a time duration for measuring the amount of data traffic. For example, the granularity may indicate to measure the data traffic per routing ID, per backhaul link, and/or per radio link control (RLC) channel. The time duration indicates for how long the measurements should be performed. The time duration may be configured as a specific time duration, and the IAB node may calculate an average amount of data traffic measured during the time duration. Alternatively, the one or more IAB nodes may be configured to perform the measurements until further notice (i.e., without defining any specific time duration). For example, the one or more IAB nodes may perform the measurements until they receive a separate indication from the IAB donor triggering the one or more IAB nodes to report the measurement results.

In step 602, the one or more IAB nodes measure the data traffic according to the configuration. For example, the one or more IAB nodes may measure the amount of data traffic per route, per backhaul link, and/or per RLC channel, depending on the granularity indicated in the configuration information. The measurements may be performed by the MT function and/or the DU of a given IAB node.

In step 603, the one or more IAB nodes transmit, or report, information indicating the measured amount (e.g., average amount) of data traffic per route for the plurality of routes to the CU of the IAB donor via the DU of the IAB donor. The one or more IAB nodes may transmit the information to the DU of the IAB donor, and the DU may then forward the information to the CU of the IAB donor. For example, the information indicating the measured amount of data traffic may be transmitted to the IAB donor via the F1 interface or RRC interface between the IAB donor and the one or more IAB nodes. It should be noted that the one or more IAB nodes may perform the measuring and reporting on a continuous basis (i.e., iteratively). For example, the one or more IAB nodes may report the measurements periodically according to the time interval indicated in the configuration received in step 601.

Figure 7:
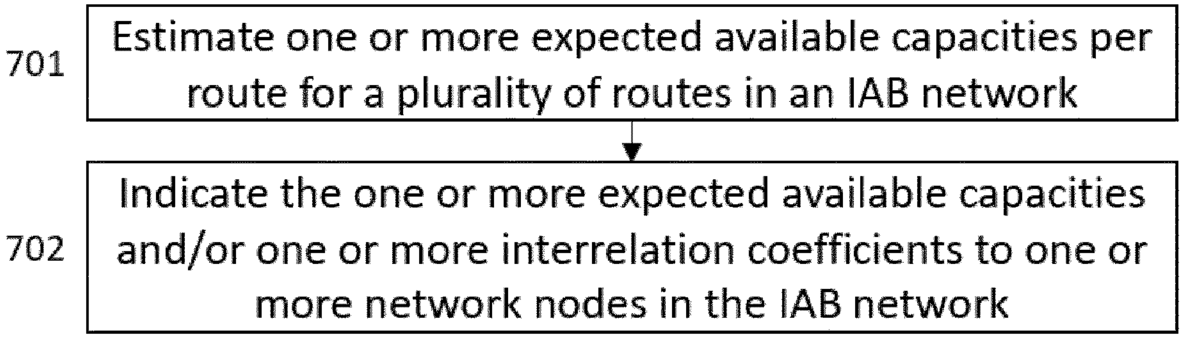
FIGS. 7-8 illustrate flow charts according to some exemplary embodiments.

FIG. 7 illustrates a flow chart according to an exemplary embodiment. The steps illustrated in FIG. 7 may be performed by an apparatus such as, or comprised in, an IAB donor or a CU of an IAB donor.

Referring to FIG. 7, in step 701, one or more expected available capacities per route for a plurality of routes in an integrated access and backhaul (IAB) network are estimated, wherein the one or more expected available capacities per route are estimated based at least partly on a capacity of one or more backhaul links per route of the plurality of routes.

In step 702, the one or more expected available capacities per route for the plurality of routes and/or one or more interrelation coefficients are indicated to one or more network nodes in the integrated access and backhaul network.

The one or more interrelation coefficients may indicate an interrelation between the one or more expected available capacities of at least two partly overlapping routes of the plurality of routes. Herein the term "network node" may refer to an integrated access and backhaul (IAB) node.

Figure 8:
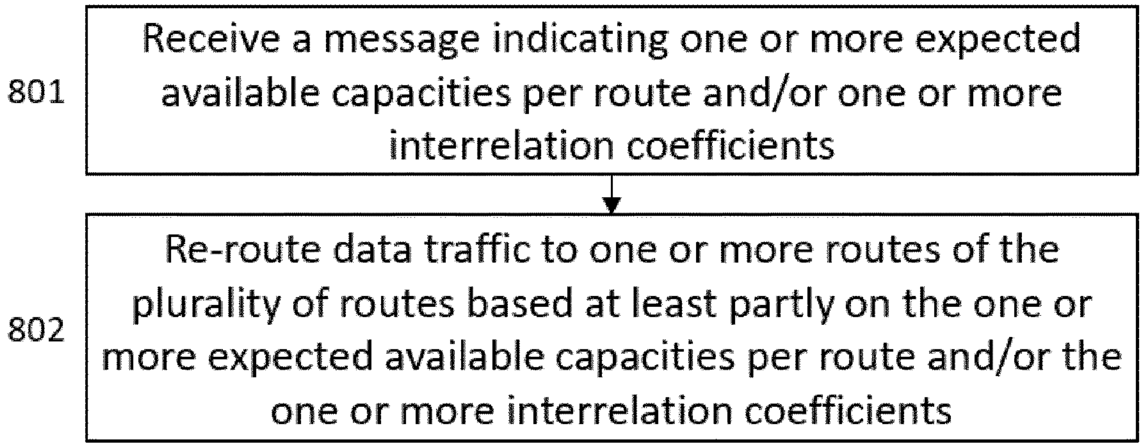

FIG. 8 illustrates a flow chart according to an exemplary embodiment. The steps illustrated in FIG. 8 may be performed by an apparatus such as, or comprised in, an IAB node.

Referring to FIG. 8, in step 801, a message indicating one or more expected available capacities per route for a plurality of routes in an integrated access and backhaul (IAB) network is received from an integrated access and backhaul (IAB) donor. The message may further indicate one or more interrelation coefficients indicating an interrelation between the one or more expected available capacities of at least two partly overlapping routes of the plurality of routes.

In step 802, data traffic is re-routed to one or more routes of the plurality of routes based at least partly on the one or more expected available capacities per route and/or the one or more interrelation coefficients.

The one or more routes may also be referred to as one or more alternative routes compared to an original route used for delivering data traffic to a destination node (e.g., IAB node) in the IAB network. The one or more alternative routes may lead to the same destination node as the original route, but the one or more alternative routes may comprise at least one backhaul link that is not on the original route. The re-routing of the data traffic to the one or more alternative routes may be performed in response to detecting a radio link failure or congestion in at least one backhaul link on the original route, or for load balancing. In other words, the re-routing to the one or more alternative routes may be performed in order to bypass the backhaul link, in which the radio link failure or congestion is detected.

The steps and/or blocks described above by means of FIGS. 5-8 are in no absolute chronological order, and some of them may be performed simultaneously or in an order differing from the described one. Other steps and/or blocks may also be executed between them or within them.

A technical advantage provided by some exemplary embodiments is that they may help to avoid congestion, when re-routing data traffic in an IAB network. Avoidance of congestion may ensure connections and service continuity, as well as reduce failure ratio and/or prevent service drop. Furthermore, some exemplary embodiments may enable to balance the load in the IAB network more efficiently.

Figure 9:
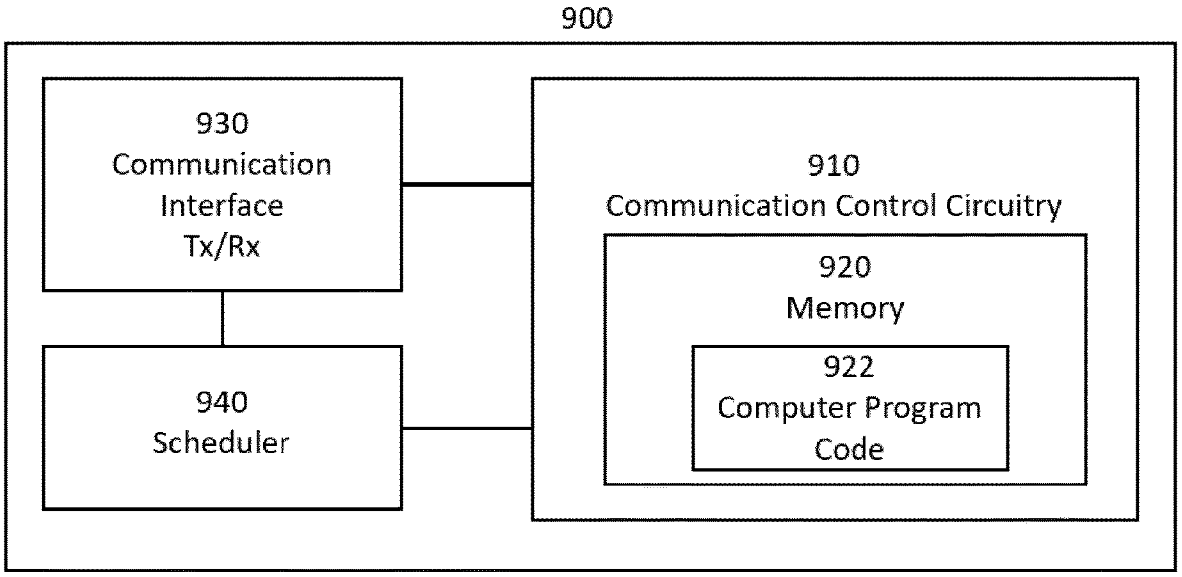
FIG. 9 illustrates an apparatus according to an exemplary embodiment.

The apparatus 900 of FIG. 9 illustrates an exemplary embodiment of an apparatus such as, or comprised in, a network element of a wireless communication network. The network element may also be referred to, for example, as a network node, a RAN node, an integrated access and backhaul (IAB) node, an IAB donor, a NodeB, an LTE evolved NodeB (eNB), a gNB, a base station, an NR base station, a 5G base station, an access node, an access point (AP), a distributed unit (DU), a centralized unit (CU), a baseband unit (BBU), a radio unit (RU), a radio head, a remote radio head (RRH), or a transmission and reception point (TRP). The apparatus 900 may comprise, for example, a circuitry or a chipset applicable for realizing some of the described exemplary embodiments. The apparatus 900 may be an electronic device comprising one or more electronic circuitries. The apparatus 900 may comprise a communication control circuitry 910 such as at least one processor, and at least one memory 920 including a computer program code (software) 922 wherein the at least one memory and the computer program code (software) 922 are configured, with the at least one processor, to cause the apparatus 900 to carry out some of the exemplary embodiments described above.

The processor is coupled to the memory 920. The processor is configured to read and write data to and from the memory 920. The memory 920 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 920 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 920 or, alternatively or additionally, they may be received, by the apparatus, via an electromagnetic carrier signal and/or may be copied from a physical entity such as a computer program product. Execution of the computer readable instructions causes the apparatus 900 to perform one or more of the functionalities described above.

The memory 920 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 900 may further comprise a communication interface 930 comprising hardware and/or software for realizing communication connectivity according to one or more communication protocols. The communication interface 930 comprises at least one transmitter (Tx) and at least one receiver (Rx) that may be integrated to the apparatus 900 or that the apparatus 900 may be connected to. The communication interface 930 provides the apparatus with radio communication capabilities to communicate in the cellular communication system. The communication interface may, for example, provide a radio interface to terminal devices. The apparatus 900 may further comprise another interface towards a core network such as the network coordinator apparatus and/or to the access nodes of the cellular communication system. The apparatus 900 may further comprise a scheduler 940 that is configured to allocate resources.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, microcontrollers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor, and at least one memory including computer program code, wherein the at least one memory and the computer program code are configured, with the at least one processor, to cause the apparatus to:

estimate one or more expected available capacities per route for a plurality of routes in an integrated access and backhaul network, wherein the one or more expected available capacities per route are estimated based at least partly on a capacity of one or more backhaul links per route of the plurality of routes;

indicate, to one or more network nodes in the integrated access and backhaul network, the one or more expected available capacities per route for the plurality of routes; and indicate, to the one or more network nodes, one or more interrelation coefficients indicating an interrelation between the one or more expected available capacities of at least two partly overlapping routes of the plurality of routes.

2. The apparatus of claim 1, wherein the apparatus is further caused to:

indicate, to the one or more network nodes, one or more first interrelation coefficients indicating a first interrelation between the one or more expected available capacities of at least a first route and a second route of the plurality of routes; and indicate, to the one or more network nodes, one or more second interrelation coefficients indicating a second interrelation between the one or more expected available capacities of at least the first route and the second route of the plurality of routes.

3. The apparatus of claim 1, wherein the apparatus is further caused to:

receive, from the one or more network nodes, information indicating a measured amount of data traffic per route for the plurality of routes; and estimate the capacity of the one or more backhaul links per route for the plurality of routes based at least partly on the measured amount of data traffic per route for the plurality of routes.

4. The apparatus of claim 3, wherein the apparatus is further caused to:

estimate an expected amount of data traffic per route for the plurality of routes based at least partly on the measured amount of data traffic per route for the plurality of routes, wherein the one or more expected available capacities per route for the plurality of routes are estimated based at least partly on the expected amount of data traffic per route for the plurality of routes; and indicate, to the one or more network nodes, the expected amount of data traffic per route for the plurality of routes.

5. The apparatus of claim 3, wherein the apparatus is further caused to:

transmit, to the one or more network nodes, a configuration for measuring and reporting the amount of data traffic per route for the plurality of routes, wherein the configuration indicates at least one of: a granularity for measuring the amount of data traffic, a time interval for reporting the measured amount of data traffic, and/or a time duration for measuring the amount of data traffic.

6. The apparatus of claim 1, wherein the apparatus is further caused to:

estimate a probability per expected available capacity of the one or more expected available capacities per route for the plurality of routes; and indicate, to the one or more network nodes, the probability per expected available capacity of the one or more expected available capacities per route for the plurality of routes.

7. An apparatus comprising at least one processor, and at least one memory including computer program code, wherein the at least one memory and the computer program code are configured, with the at least one processor, to cause the apparatus to: receive, from an integrated access and backhaul donor, a message indicating one or more expected available capacities per route for a plurality of routes in an integrated access and backhaul network, wherein the message further indicates one or more interrelation coefficients indicating an interrelation between the one or more expected available capacities of at least two partly overlapping routes of the plurality of routes, and wherein the data traffic is re-routed to the one or more routes based at least partly on the one or more expected available capacities per route and the one or more interrelation coefficients; and re-route data traffic to one or more routes of the plurality of routes based at least partly on the one or more expected available capacities per route.

8. The apparatus of claim 7, wherein the data traffic is re-routed to the at least two partly overlapping routes based at least partly on the one or more expected available capacities per route and the one or more interrelation coefficients.

9. The apparatus of claim 7, wherein the message further indicates an expected amount of data traffic per route for the plurality of routes, and wherein the data traffic is re-routed to the one or more routes based at least partly on the one or more expected available capacities per route and the expected amount of data traffic per route.

10. The apparatus of claim 7 wherein the apparatus is further caused to:

measure an amount of data traffic per route for the plurality of routes over a time duration; and report, to the integrated access and backhaul donor, information indicating the measured amount of data traffic per route for the plurality of routes.

11. The apparatus of claim 10, wherein the apparatus is further caused to:

receive, from the integrated access and backhaul donor, a configuration for measuring and reporting the amount of data traffic per route for the plurality of routes, wherein the configuration indicates at least one of: a granularity for measuring the amount of data traffic, a time interval for reporting the measured amount of data traffic, and/or the time duration for measuring the amount of data traffic, and wherein the amount of data traffic per route for the plurality of routes is measured and reported according to the configuration.

12. The apparatus of claim 7, wherein the message further indicates a probability per expected available capacity of the one or more expected available capacities per route for the plurality of routes, and wherein the data traffic is re-routed to the one or more routes based at least partly on the one or more expected available capacities per route and the probability per expected available capacity.

13. A method comprising:

estimating, by an integrated access and backhaul donor, one or more expected available capacities per route for a plurality of routes in an integrated access and backhaul network, wherein the one or more expected available capacities per route are estimated based at least partly on a capacity of one or more backhaul links per route of the plurality of routes;

indicating, by the integrated access and backhaul donor, to one or more network nodes in the integrated access and backhaul network, the one or more expected available capacities per route for the plurality of routes; and indicate, to the one or more network nodes, one or more interrelation coefficients indicating an interrelation between the one or more expected available capacities of at least two partly overlapping routes of the plurality of routes.

* * * * *